United States Patent [19]

Adams

[11] 3,866,876

[45] Feb. 18, 1975

[54] SEAT SLIDE MECHANISM

[75] Inventor: Albert John Adams, Fetcham, England

[73] Assignee: A. W. Chapman Limited, London, England

[22] Filed: May 20, 1974

[21] Appl. No.: 471,333

[30] Foreign Application Priority Data

May 29, 1973 Great Britain.................... 25533/73

[52] U.S. Cl................. 248/429, 248/293, 297/385, 308/3.6
[51] Int. Cl.. F16m 11/20, F16c 29/00, A62b 35/00
[58] Field of Search........... 248/393, 398, 424, 429, 248/430; 292/124, 215, 98, 32, 27, 49, 220, 234, 197; 312/348, 333; 308/3.6; 108/102, 143; 297/379

[56] References Cited
UNITED STATES PATENTS

| 1,964,405 | 6/1934 | Nenne................................ 248/429 |
| 2,336,433 | 12/1943 | Woina................................ 248/430 |
| 2,951,527 | 9/1960 | Wassilieff....................... 248/430 X |
| 3,258,241 | 6/1966 | Oswald .............................. 248/430 |
| 3,259,413 | 7/1966 | Steckle .............................. 292/132 |
| 3,394,912 | 7/1968 | Bullen............................... 248/430 |
| 3,394,912 | 7/1968 | Bullen........................... 308/3.6 X |
| 3,627,253 | 12/1971 | Germain et al..................... 248/429 |

Primary Examiner—James T. McCall
Attorney, Agent, or Firm—Irving M. Weiner

[57] ABSTRACT

A seat slide mechanism which includes interengaged slide and rail of which the rail is formed to provided a rack which is engaged by prongs on a slide-mounted catch lever to lock the slide to the rail. The catch lever is pivotable about a vertical axis as a result of angular movement (upwards or downwards) of an operating member about a horizontal axis, the lever carrying a cam follower which is in contact with a cam formed on the member.

8 Claims, 11 Drawing Figures

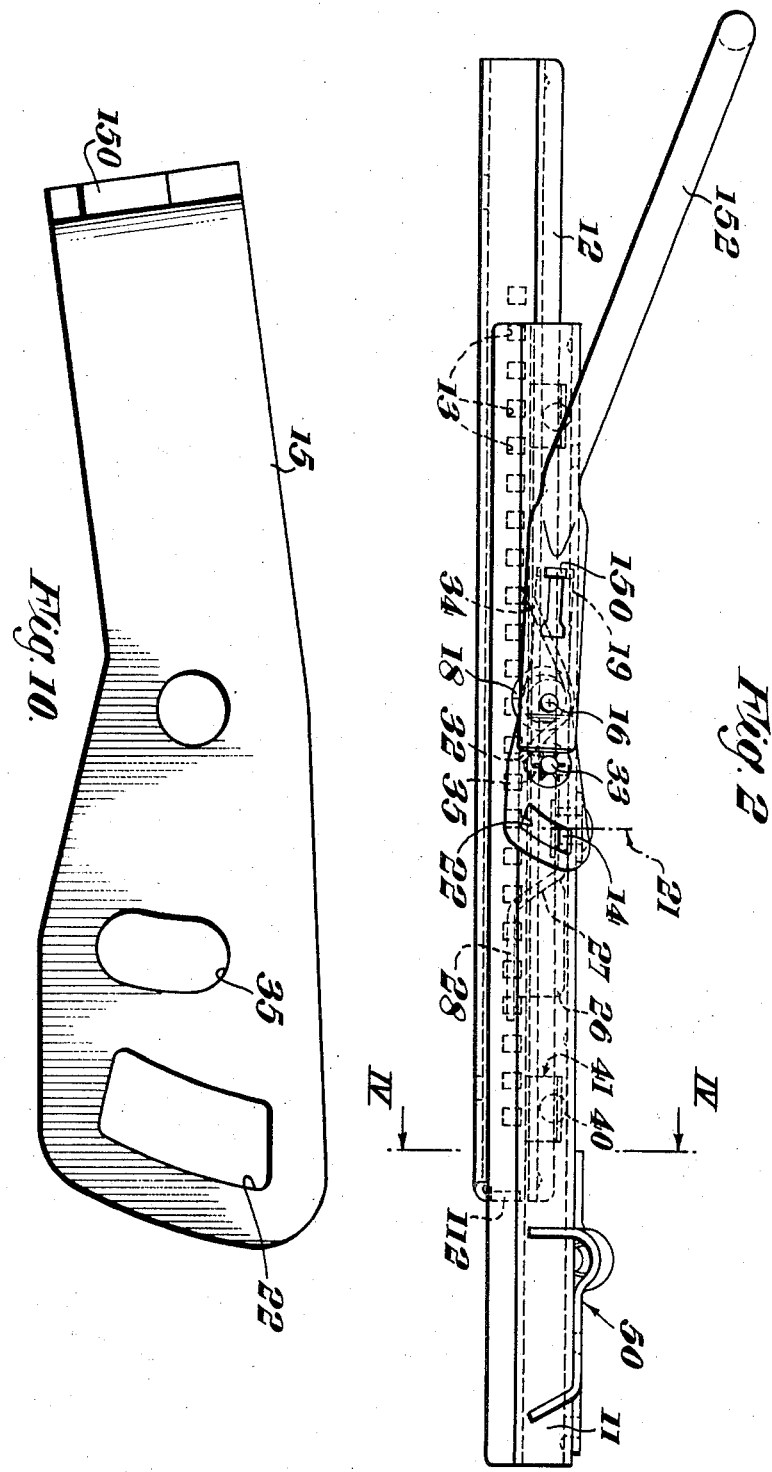

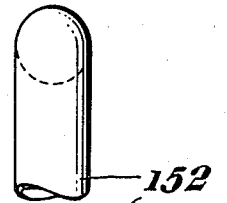
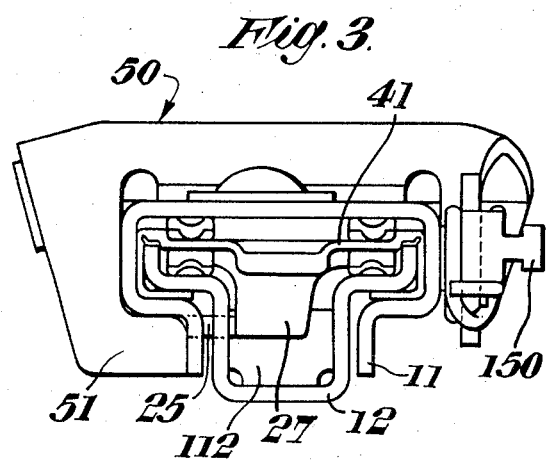
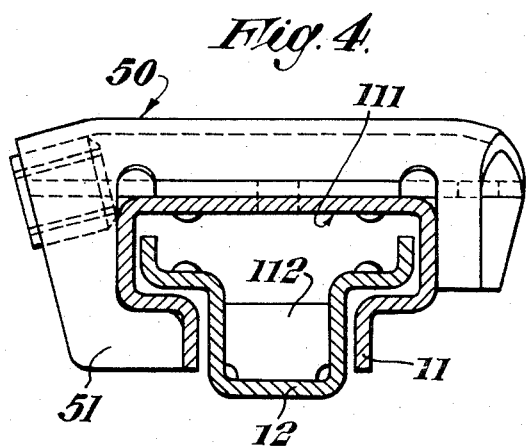
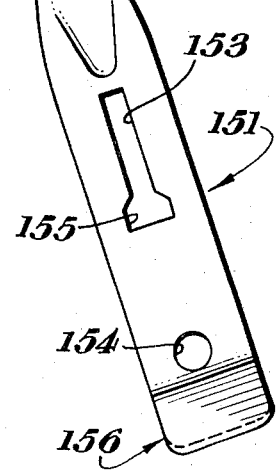

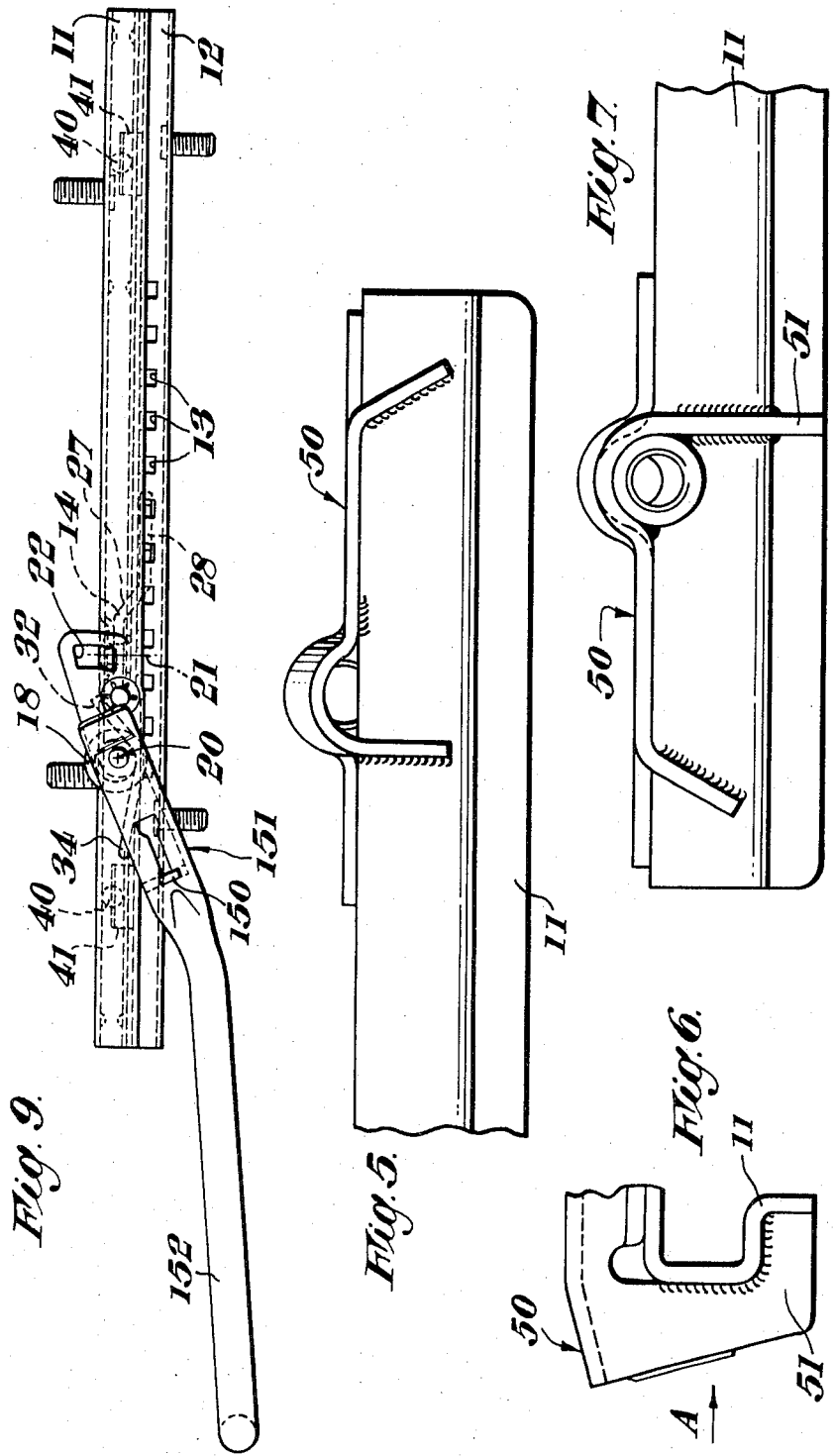

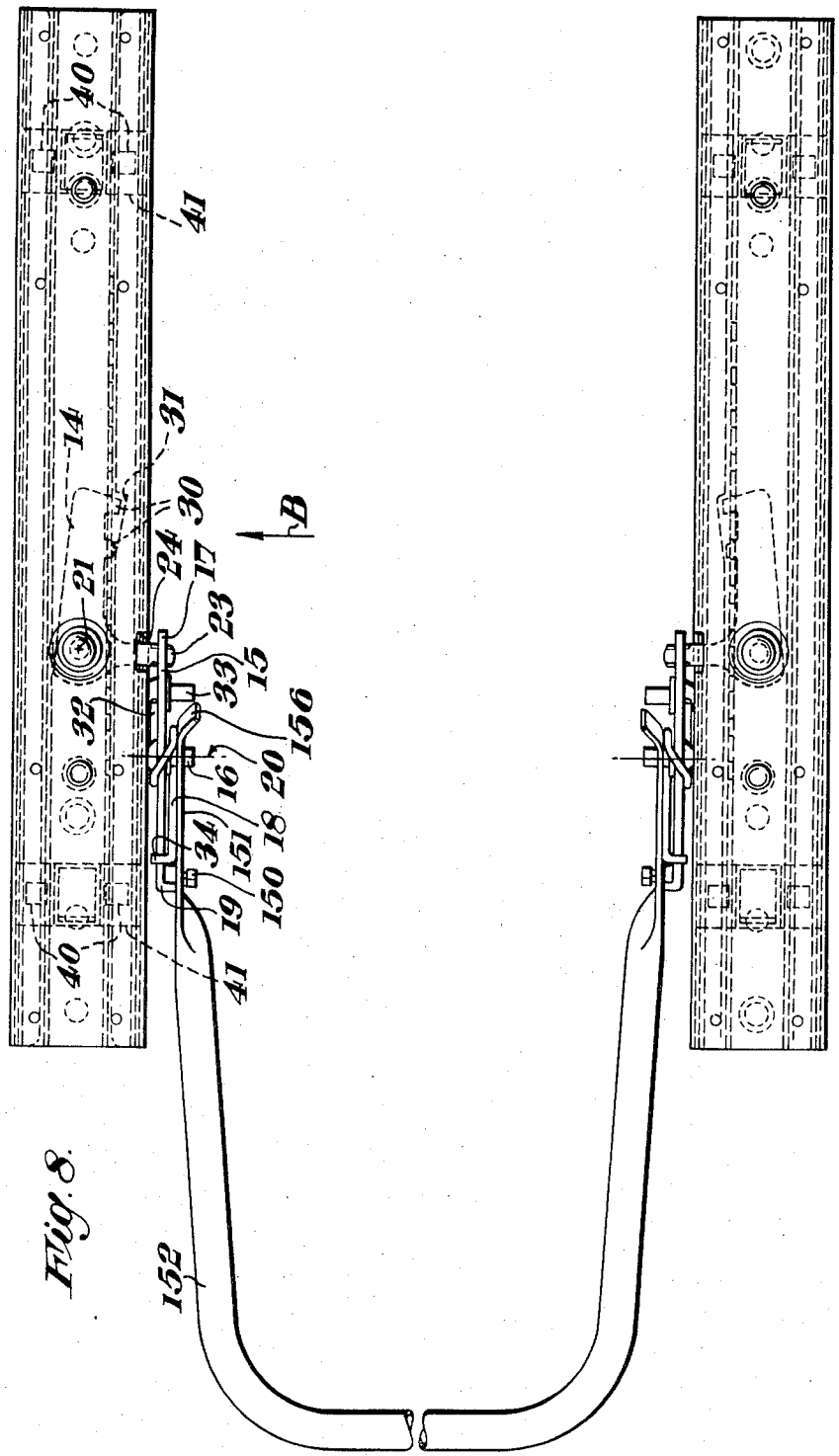

3,866,876

SEAT SLIDE MECHANISM

This invention relates to a seat slide mechanism.

The present invention consists in a seat slide mechanism including a slide and a rail, a rack on said rail, a catch lever pivotally mounted on said slide and influenced by spring means into engagement with said rack to lick the slide and the rail to one another, and an operating member so pivotally mounted on said slide and so connected at one of its ends to said catch lever that angular movement of the other of its ends about the horizontal pivotal axis of said operating member causes the catch lever to move angularly about its vertical pivotal axis against the influence of said spring means out of engagement with said rack.

Preferably, the connection between said one end of the operating member and said catch lever is by cam means on said operating member and by a cam follower on said catch lever.

In a preferred embodiment of the mechanism according to the preceding paragraph, said cam means is constituted by an arcuate closed slot formed in said one end of the operating member and said cam follower is constituted by an arm which is connected at one end thereof to the catch lever and which extends into said arcuate slot.

Moreover, in said preferred embodiment said spring means is constituted by a coil spring of which one free end is in contact with a pin which is secured to the slide and of which the other free end is in contact with said operating member, the coiled portion of said spring encircling the horizontal pivotal axis of the operating member.

The present invention will now be more particularly described with reference to the accompanying drawings, in which:

FIG. 2 illustrates a side elevation of the mechanism of FIG. 1;

FIG. 3 illustrates an end elevation of the mechansim of FIGS. 1 and 2, a handle or bar illustrated in said FIGS. 1 and 2 having been omitted;

FIG. 4 illustrates a section taken on the line IV—IV in FIG. 2;

FIGS. 5, 6 and 7 are detail views illustrating the places at which the passenger safety belt anchorage bracket is welded to the seat slide;

FIG. 8 illustrates a complete slide set for a single seat, the construction effecting dual locking (namely, locking of the two slides to the respective rails);

FIG. 9 illustrates a side elevation of the upper slide set as seen in FIG. 8, looking in the direction of the arrow B;

FIG. 10 is an elevation of an operating member which forms part of the slide set illustrated in FIGS. 8 and 9; and FIG. 11 is a side elevation of the common lift-up handle which is illustrated in FIGS. 8 and 9.

Figure 1:
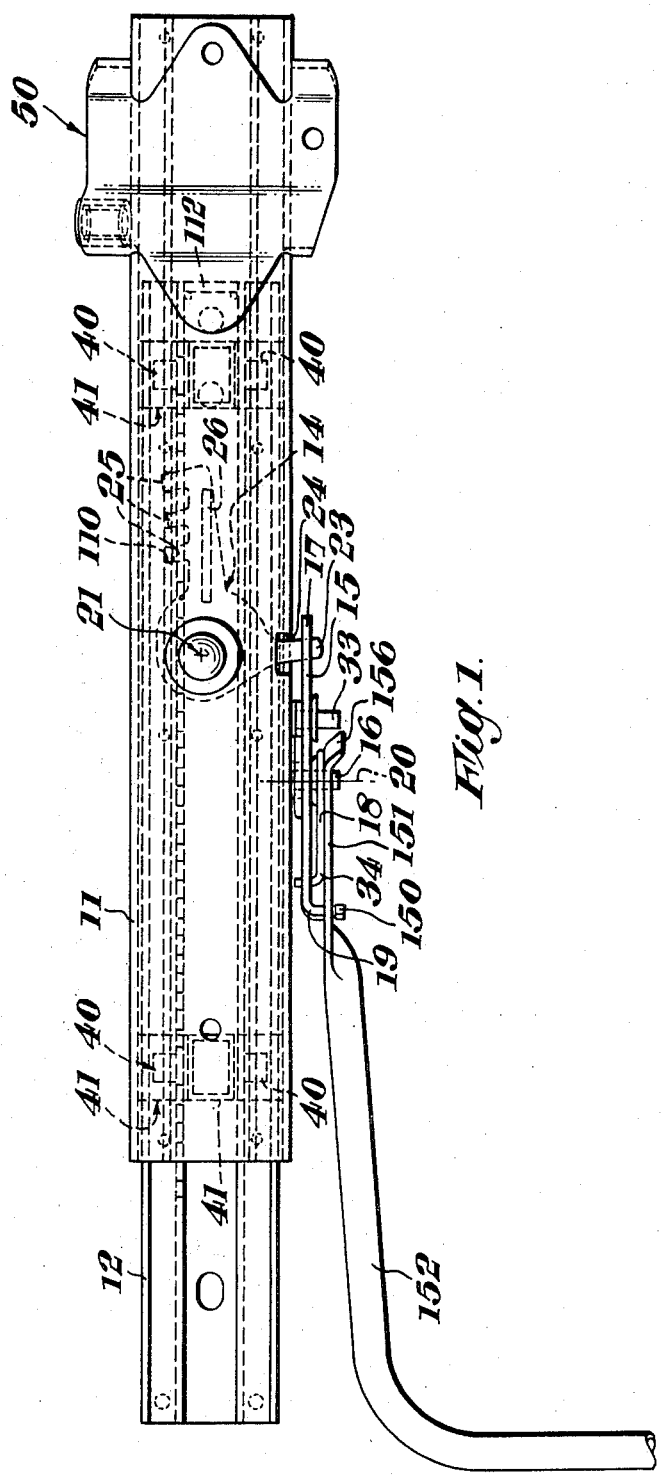
FIG. 1 illustrates a top plan view of one embodiment of seat slide mechanism according to the invention, said mechanism constituting one half (right hand) of a complete seat slide set.

Referring now to the drawings, and in particular to FIGS. 1, 2, 3, 4, 8 and 9, it will be seen that there is illustrated therein a seat slide mechanism 10 including a slide 11 and a rail 12; a rack on said rail, said rack being constituted by a plurality of holes 13 in said rail; a catch lever 14 pivotally mounted on said slide; an operating member 15 pivotally mounted on a stud 16 on said slide and connected at its end 17 to the catch lever 14; spring means 18 urging the catch lever 14 at all times into engagement with said rack to lock the slide 11 and the rail 12 to one another; angular movement of the end 19 of the operating member 15 about the horizontal pivotal axis 20 of said operating member causing the catch lever 14 to move angularly about its vertical pivotal axis 21 against the influence of the spring means 18 out of engagement with said rack, whereby the slide 11 and the rail 12 are freed for movement of the slide relative to the rail.

The connection between the end 17 of the operating member 15 and the catch lever 14 is by way of cam means on said operating member, said cam means being constituted by an arcuate closed slot 22 formed in said end 17, and by way of a cam follower on said catch lever, said cam follower being constituted by an arm 23 which is integral with said catch lever and which extends into and through said arcuate slot 22.

In view of the fact that the catch lever is accommodated within the space which is defined by the interengaged slide 11 and rail 12, a slot 24 is provided in said slide 11 and said arm 23 projects through said slot 24 into the slot 22.

The spring means 18 is a coiled spring whose coiled portion encircles the pivotal axis 20 which is provided by the stud 16 and whose free end 32 is in contact with a stud 33 secured to the slide and whose free end 34 is in contact with the end 19 of the operating member. The stud 33 extends through an arcuate slot 35 in the operating member. The two studs 16 and 33 are projection welded to the slide 11.

The slide 11 and the rail 12 of the embodiment illustrated in FIGS. 1, 2 and 3 and of the embodiment illustrated in FIGS. 8 and 9 run on rollers 40 arranged in pairs, each pair of rollers being housed in a roller retainer 41 whose construction and function are fully described in our co-pending U.S. Pat. application Ser. No. 26,245 of 1972.

The catch lever 14 illustrated in FIGS. 1, 2 and 3 has three teeth or prongs 25 and the slide 11 is provided with three holes 110 into which said prongs 25 extend. Thus, as clearly seen in FIG. 1, in any setting of the slide and rail mechanism, said prongs 25 extend through three adjacent holes 13 in the rail 12 and into the three holes 110 in the slide 11, thereby firmly locking said slide and said rail to one another.

The catch lever 14 illustrated in FIGS. 8 and 9 has two teeth or prongs 30 which, in any setting of the slide and rail mechanism, extend through two adjacent holes 13 in the rail 12 and into a cut-away portion 31 in the slide 11.

The catch levers 14 of the two embodiments are cranked to provide portions 27, 28 for the purpose of bringing the respective prongs 25 or 30 into horizontal register with the rack constituted by said holes 13.

It will be appreciated that the seat slide sets described above are dual locking, that is, the left hand slide and rail are releasably locked to onea nother and the right hand slide and rail are releasably locked to one another, the ends 19 of the two operating members being interconnected by a substantially U-shaped common handle or bar (to be described below) which is located at the front of the seat in a vehicle. In the embodiment shown in FIGS. 1 to 3, the occupant of the seat will press the bar downwardly to release the locking of the slide 11 to the rail 12 in order to adjust the position of the seat forwardly or rearwardly because, as will be apparent from FIG. 2, the operating member 15 must be moved angularly about its pivot axis 20 in an anticlockwise direction in order to move the prongs 25 out of engagement with the holes 13. In the embodiment which is shown in FIGS. 8 and 9, the occupant of the seat will lift the bar upwardly in order to effect said unlocking and adjustment because the operating member 15 must be moved angularly about its pivot axis 20 is a clockwise direction (as seen in FIG. 9) in order to move the prongs 30 out of engagement with the holes 13. Upon letting the bar go, the spring means 18 will ensure that the prongs 25 or 30 will be forced to extend through the holes 13 provided that the two are in register.

The precise mode of securing the free ends of the bar to the ends 19 of the respective operating member 15 is not critical and one means therefor is illustrated in FIGS. 1, 2, 8, 9 and 11 by way of example. It will be seen that the free ends 150 of the operating members 15 in said Figures are enlarged or formed in the manner of a key. This key 150 is inwardly directed, namely, bent inwardly towards the vertical plane located midway between the two rails and two slides which form a seat slide set.

The ends or end portions 151 of a tubular common handle or bar 152, which is substantially U-shaped in plan, are flattened and a key-hole slot 153 and a circular hole 154 are formed in each end portion. Connection of said end portions 151 of the U-shaped bar 152 is effected by causing the keys 150 to extend through the large portions 155 of the slots 153 and by pushing the bar 152 towards the rear of the seat slide in order to bring the holes 154 into alignment with the studs 16 about whose axes 20 the operating members 15 are angularly movable. The terminal portions 156 of the portions 151 are so cranked as to provide inclined surfaces over which said studs can slide when the bar 152 is pushed rearwardly as explained above, and as soon as the studs 16 and the holes 154 have been brought into alignment with one another, the limbs of the U-shaped bar 152 will spring inwardly again as the studs project through the said holes 154.

Referring to FIGS. 5, 6 and 7, these illustrate the positions in which the seat belt anchorage 50 should be welded to the slide 11, FIG. 7 illustrating the view of said slide and anchorage in the direction of the arrow A in FIG. 6. Said FIG. 6 shows clearly that the anchorage is provided with a flange 51 which follows the cross-sectional form of said slide 11 at one side thereof, the FIGS. 5 to 7 illustrating the arrangement of the anchorage 50 and the flange 51 for the slide of a right hand side slide and rail, the arrangement for the slide of a left hand side slide and rail being of opposite hand. The flange 51 counteracts any tendency of the anchorage 50 to lift under load.

The provision of seat belt anchorages 50 on the rear ends of the slides 11 of a seat slide set results (when the seat is occupied by a passenger who has fastened his seat belt around himself and when the vehicle containing the seat is violently decelerated) in very large G forces being applied to the prongs 25 on the catch levers 14. It will be apparent that, under said deceleration conditions, said forces will try to move the slide 11 relative to the rail 12 from right to left as seen in FIG. 1. This attempted movement causes the prongs 25 to be clamped between the relevant edges of the holes 110 in said slide and the relevant edges of the holes 13, and this clamping not only arrests the incipient movement but also helps to ensure that the prongs 25 will not disengage from the holes 110, 13. Furthermore, said very large G forces have a tendency to cause distortion of the catch levers such as would or might lead to the prongs 25 lifting out of the holes 110, 13 and this tendency is counteracted by strengthening ribs 26 (FIGS. 1 and 2) which are welded to the catch levers 14. There is a very small clearance between the upper edge of the rib 26 and the relevant portion of the underside 111 (see FIG. 4) of the slide 11, the arrangement being such that said upper edges 26 and the relevant underside portions 111 contact one another when the catch levers 14 are under load. The provision of the strengthening ribs 26 on the catch levers 14 is necessary when the slides 11 carry seat belt anchorages. On the contrary, when such anchorages are not provided on the slides 11, the strengthening ribs 26 may be omitted, this mofification being exemplified by the embodiment of FIGS. 8 and 9.

FIG. 10 illustrates clearly the arcuate slot 35 which is provided in the operating members 15. The Figure in fact illustrates the member 15 which is employed in the "lift-up" construction shown in FIGS. 8 and 9 but the member 15 for the "push-down" construction shown in FIGS. 1 and 2 is not significantly different.

Lastly, it will be seen from FIGS. 1 to 4, that, in tha particular embodiment which incorporates the seat belt anchorage 50, the rail 12 is provided with a flange 112 which consists of an extension of the bottom of the channel of the rail, said extension being turned up so as to become located between the substantially parallel limbs of the U of said channel. This flange is provided in order to prevent the rear end of the rail section from collapsing under load.

The mechanisms described above with reference to the drawings have been tested on a rig with an applied horizontal load of 6600 lbs and in the slide sections were not distorted in any respect. There was only a small degree of bending of the prongs on the catch levers.

I claim:

1. A seat slide mechanism including a slide and a rail, a rack on said rail, a catch lever pivotally mounted on said slide, spring means influencing said catch lever into engagement with said rack to lock the slide and the rail to one another, an operating member pivotally mounted on said slide and having two ends, one of said ends being connected to said catch lever, whereby angular movement of the other of said ends of said operating member about the horizonatal pivotal axis of said operaing member causes the catch lever to move angularly about its vertical pivotal axis against the influence of said spring means out of engagement with said rack.

2. A mechanism as claimed in claim 1, wherein the connection between said one end of the operating member and said catch lever is constituted by cam means at said one end of the operating member and by a cam follower on said catch lever.

3. A mechanism as claimed in claim 2, wherein said cam means is constituted by an arcuate slot formed in said one end of the operating member and said cam follower is constituted by an arm which is connected at one end thereof to the catch lever and which extends into said arcuate slot.

4. A mechanism as claimed in claim 1, wherein said spring means is constituted by a coil spring, a pin secured to the slide, said coil spring having two free ends of which one free end is in contact with said pin and of which the other free end is in contact with said operating member, the coiled portion of said coil spring encircling the horizontal pivotal axis of the operating member.

5. A mechanism as claimed in claim 1, wherein said catch lever comprises at least two prongs and wherein said rack is constituted by spaced holes in said rail, said prongs on said prongs on said catch lever being urged by said spring means to extend through a corresponding number of said holes to lock said slide to said rail.

6. A mechanism as claimed in claim 5, wherein said slide also has at least two holes therein, said holes in said holes in said slide being so positioned that said at least two prongs on the catch lever are urged to extend into or through the holes in the slide under the influence of said spring means, whereby in use of said mechanism said prongs extend not only through the spaced holes in said rail but also into the holes in said slide to lock the rail and the slide to one another.

7. A mechanism as claimed in claim 6, which further includes an anchorage secured to the slide for one end of one part of a safety belt which is fastenable around the body of the occupant of the seat to which the mechanism is intended to be connected, a strengthening rib on the catch lever, said strengthening rib having an upper edge facing the underside of said slide and being spaced apart from but in close proximity to said underside, whereby when the catch lever is under load due to violent deceleration, said upper edge makes contact with the slide to prevent said prongs from lifting out of said holes.

8. A mechanism as claimed in claim 1, wherein said other end of the operating member comprises a portion of reduced dimensions connected to an enlarged terminal portion in the manner of a neck and head, a handle having an end portion, a key-hole slot and a hole which are formed in said end portion of said handle, the key-hole slot having an enlarged slot portion capable of permitting the passage therethrough of the enlarged terminal portion of said other end of the operating member and also having a narrow slot portion which communicates with the enlarged slot portion and which is wide enough to permit the handle to be moved relative to the operating member with said portion of reduced dimensions in said narrow slot portion, such movement of said handle being for the purpose of causing engagement of said hole in the end portion of the handle by the element which provides the pivotal axis of the operating member.

* * * * *